(12) United States Patent
Chen et al.

(10) Patent No.: US 8,615,148 B2
(45) Date of Patent: Dec. 24, 2013

(54) OPTICAL COUPLER BETWEEN PLANAR MULTIMODE WAVEGUIDES

(75) Inventors: Long Chen, North Brunswick, NJ (US); Christopher Doerr, Middletown, NJ (US)

(73) Assignee: Alcatel Lucent, Paris (FR)

( * ) Notice: Subject to any disclaimer, the term of this patent is extended or adjusted under 35 U.S.C. 154(b) by 328 days.

(21) Appl. No.: 13/040,761

(22) Filed: Mar. 4, 2011

(65) Prior Publication Data
US 2012/0224813 A1 Sep. 6, 2012

(51) Int. Cl.
*G02B 6/26* (2006.01)

(52) U.S. Cl.
USPC .......................................................... 385/43

(58) Field of Classification Search
USPC .......................................................... 385/43
See application file for complete search history.

(56) References Cited

U.S. PATENT DOCUMENTS

| | | | | |
|---|---|---|---|---|
| 6,067,387 A | * | 5/2000 | Oh et al. ............................. | 385/2 |
| 6,396,984 B1 | * | 5/2002 | Cho et al. ......................... | 385/43 |
| 6,697,551 B2 | * | 2/2004 | Lee et al. ......................... | 385/28 |
| 7,120,335 B2 | * | 10/2006 | Agarwal et al. ................. | 385/39 |
| 7,218,809 B2 | * | 5/2007 | Zhou et al. ....................... | 385/28 |
| 7,251,406 B2 | * | 7/2007 | Luo et al. ........................ | 385/131 |
| 7,565,046 B2 | * | 7/2009 | Feng et al. ....................... | 385/28 |
| 7,577,327 B2 | * | 8/2009 | Blauvelt et al. ................. | 385/39 |
| 7,783,146 B2 | * | 8/2010 | Blauvelt et al. ................. | 385/50 |
| 8,031,991 B2 | * | 10/2011 | Webster et al. ................. | 385/28 |
| 2002/0031296 A1 | * | 3/2002 | Lee et al. ......................... | 385/28 |
| 2009/0297093 A1 | * | 12/2009 | Webster et al. ................. | 385/14 |
| 2012/0141069 A1 | * | 6/2012 | Ming-Chang et al. .......... | 385/43 |

OTHER PUBLICATIONS

Tolstikhin et al, Laterally Coupled DFB Lasers for One-Step Growth Photonic Integrated Circuits in InP, IEEE, vol. 21, No. 10, May 15, 2009, pp. 621-623.
R. Zengerle et al., "Laterally Tapered InP-InGaAsP Waveguides for Low-Loss Chip-to-Fiber Butt Coupling: A Comparison of Different Configurations," IEEE Photonics Technology Letters, vol. 7, No. 5, May 1995).

* cited by examiner

*Primary Examiner* — Sung Pak
(74) *Attorney, Agent, or Firm* — Kramer & Amado PC

(57) ABSTRACT

Various exemplary embodiments relate to an optical waveguide coupler including: a first optical waveguide including a first area and a tapered area having a tapered width; a second optical waveguide including a first area and a tapered area having a tapered width; wherein the first area of the of the second optical waveguide overlaps the tapered area of the first optical wave guide, and wherein the tapered area of the second optical waveguide overlaps the first area of the first optical waveguide.

18 Claims, 2 Drawing Sheets

OPTICAL COUPLER BETWEEN PLANAR MULTIMODE WAVEGUIDES

TECHNICAL FIELD

Various exemplary embodiments disclosed herein relate generally to optical coupling between planar multimode waveguides.

BACKGROUND

Great advances are being made in optical processing of optical signals. This is leading to the development of optical circuits. Such optical circuits use optical waveguides to transmit and receive optical signals from other devices. Therefore, optical waveguides from different devices are coupled together to allow communication between the optical circuits.

SUMMARY

There is a need for an optical coupling between two optical waveguides that results in low signal loss and that accommodates multimode transmission of optical signals. Further, the coupling of waveguides made of different materials should be accommodated.

In light of the present need for an optical coupler between two optical waveguides that results in low signal loss and that accommodates multimode transmission of optical signals, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in the later sections.

Various exemplary embodiments provide an optical waveguide coupler including: a first optical waveguide including a first area and a tapered area having a tapered width; a second optical waveguide including a first area and a tapered area having a tapered width; wherein the first area of the of the second optical waveguide overlaps the tapered area of the first optical wave guide, and wherein the tapered area of the second optical waveguide overlaps the first area of the first optical waveguide.

Various exemplary embodiments further provide an optical waveguide coupler including: a first optical waveguide including a first area and a tapered area having a tapered width; a second optical waveguide including a first area; wherein the first area of the of the second optical waveguide overlaps the tapered area of the first optical wave guide.

Various exemplary embodiments relate to a method of manufacturing an optical waveguide coupling, including: depositing and patterning a first optical waveguide material to form a first optical waveguide including a first area and a tapered area having a tapered width; depositing and patterning a second optical waveguide material to form a second optical waveguide including a first area and a tapered area having a tapered width; wherein the first area of the of the second optical waveguide overlaps the tapered area of the first optical wave guide, and wherein the tapered area of the second optical waveguide overlaps the first area of the first optical waveguide.

Various embodiments may further include a planarization layer, wherein the planarization layer has a thickness approximately the same as a thickness of the first optical waveguide and wherein the first area of the second optical waveguide overlaps the tapered area of the first optical waveguide and the planarization layer.

Various embodiments may be further adapted wherein the first areas of the first and second optical waveguide have substantially a constant width.

Various embodiments may be further adapted wherein the first and second optical waveguides are made of different materials.

Various embodiments may further include a spacing layer between the first and second optical waveguide.

Various embodiments may be further adapted wherein the spacing layer has a thickness of less than 200 nm, or less than 100 nm, or approximately 100 nm.

Various embodiments may be further adapted wherein spacing layer is made of one of $SiO_2$, SiON, $Si_3N_4$, and BCB.

Various embodiments may be further adapted wherein the thickness of the tapered area of any of the first and the second optical waveguide is vertically tapered.

Various embodiments may further include wherein the vertical taper is a stepped taper.

Various embodiments may be further adapted wherein the first and second optical waveguides are multimode waveguides.

Various embodiments may be further adapted wherein the dimensions of the tapered areas of the first and second optical waveguide are configured to allow the propagation of multimode optical signals through the optical waveguide coupling.

Various embodiments may be further adapted wherein the first area of the first optical waveguide overlaps the first area of the second optical waveguide.

Various embodiments may be further adapted wherein the taper area of the first optical waveguide overlaps the taper area of the second optical waveguide.

Various embodiments may be further adapted wherein the first optical waveguide further comprises a boundary between the first and second area and the second optical waveguide further comprises a boundary between the first and second area, and wherein the boundaries of the first and second optical waveguides are substantially aligned.

BRIEF DESCRIPTION OF THE DRAWINGS

In order to better understand various exemplary embodiments, reference is made to the accompanying drawings, wherein.

DETAILED DESCRIPTION

Figure 1:
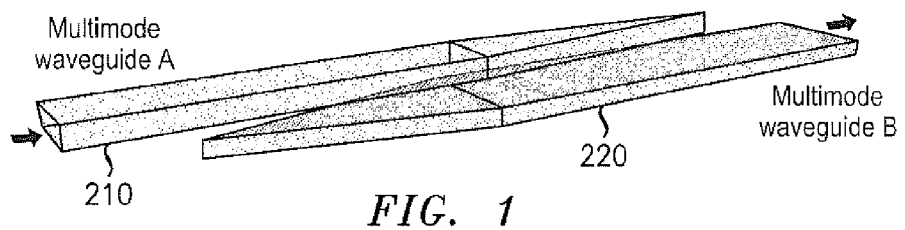
FIG. 1 illustrates a perspective view of an embodiment of an optical wave guide coupling.

Referring now to the drawings, in which like numerals refer to like components or steps, there are disclosed broad aspects of various exemplary embodiments.

Figure 2:
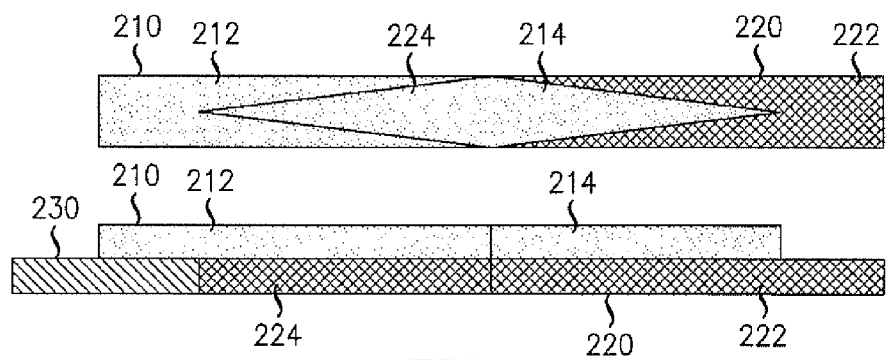
FIG. 2 illustrates a plan and side view of the embodiment of an optical waveguide coupler illustrated in FIG. 1.

FIG. 1 illustrates a perspective view of an embodiment of an optical waveguide coupling. FIG. 2 illustrates a plan and side view of the embodiment of an optical waveguide coupler illustrated in FIG. 1. A first optical waveguide 210 includes a first area 212 and a tapered area 214. The first area 212 may have a substantially constant width and thickness. The first area 212 transitions into a tapered area 214. Similarly, a second optical waveguide 220 includes a first area 222 and a tapered area 224. The first area 222 may have a substantially constant width and thickness. The first area 222 transitions into a tapered area 224. Also, the optical coupling may include a planarization layer 230.

The first area 212 of the first optical waveguide may be adjacent to or overlap the tapered area 224 of the second optical waveguide. The first area 222 of the second optical waveguide may be adjacent to or overlap the tapered area 214 of the first optical waveguide. This arrangement of the first and second optical waveguides results in a low loss coupling of multimode optical signals between the first and second optical waveguides. The tapered regions 214, 224 cause light signals in the optical waveguides to be forced out of the optical waveguide into the adjacent optical waveguide. Further, the taper may reduce optical reflection and scattering.

Each optical waveguide has a boundary from the first area to the tapered area. The boundaries of the first and second optical waveguides may be substantially aligned.

The length of the taper is selected so that all propagating modes of a light signal will pass through the optical waveguide coupler with low loss. A longer taper corresponds to the ability to pass higher order propagating modes. Also, a longer taper adds to the overall length of the optical waveguide coupling. Therefore, the length of the coupler may be selected to be the shortest taper that may accommodate the highest order propagating mode. Further, while a linear taper is illustrated, a non-linear taper may be used as well. For example, a concave non-linear taper may allow for a shorter optical waveguide coupler for a given higher order propagating mode.

The planarization layer 230 may have a thickness approximately the same as thickness of the first second optical waveguide 220. The planarization layer 230 along with the second optical waveguide 220 combine to provide a flat surface for the formation of the first optical waveguide 210. When an optical waveguide is not flat, then losses may increase due to optical scattering and reflections. Therefore, the planarization layer 230 prevents any steps in the first optical waveguide 210, thus helping to prevent losses in the first optical waveguide 212. The planarization layer 230 may be made of any material that provides satisfactory planarization and processing compatibility, and with a refractive index lower than either waveguides.

A spacer (not shown) may also be present between the first and second optical waveguides 210, 220. The spacer may help to reduce optical scattering and reflections at the boundaries of the optical waveguides 210, 220, especially at the tip of the tapered areas 214, 224. The spacer may also be beneficial when the first and second optical waveguides 210, 220 are made of the same material. The optical waveguides may be manufactured using common semiconductor patterning processes. Therefore, the spacer may prevent the over etching of the optical waveguide 220 while etching the optical waveguide 210.

The thickness of the spacer may be selected to optimize the optical coupling and device size. It should be noted that as the thickness of the spacer increases, the amount of optical scattering/reflections at the taper interfaces will decrease, but the length of the taper may need to increase in order to fully couple all desired propagation modes from one waveguide to the other. The thickness of the spacer may be less than 200 nm, may be less than 100 nm, or may be about 100 nm. The spacer may be made of any material that passes the optical signal with a minimal loss and/or that has an index of refraction lower than either waveguide. For example, suitable materials may include one of $SiO_2$, SiON, $Si_3N_4$, and benzocyclobutene (BCB). In some cases, the spacer can be of the same material as the planarization layer, and may be deposited together with the planarization layer. In some cases, the spacer can be of a different material than the planarization layer and may be deposited separately.

The optical waveguide coupler may also be clad. An example cladding is $SiO_2$. This cladding may reduce losses in the optical waveguides as well as provide protection to the optical waveguide coupling.

While the optical waveguide coupler as shown in FIGS. 1 and 2 accommodates multimode propagation, the optical waveguide coupling may be designed for single mode operation. In such an embodiment, the taper required would be shorter than that required for multimode operation. Further, single mode operation is more tolerant of a larger spacer, therefore the thickness of the spacer in single mode operation may be larger than in multimode operation.

The first and second optical waveguides 210, 220 may be of the same or different materials. The first areas of the first and second optical waveguides are shown as having the same width, but they may be of different widths. In any case, the width and thickness of the first area of each waveguide need to be sufficient to support the highest order propagation mode desired. Examples of optical waveguide materials may include InGaAsP, Si, SiON, $Si_3N_4$, silica, and BCB.

Figure 3:
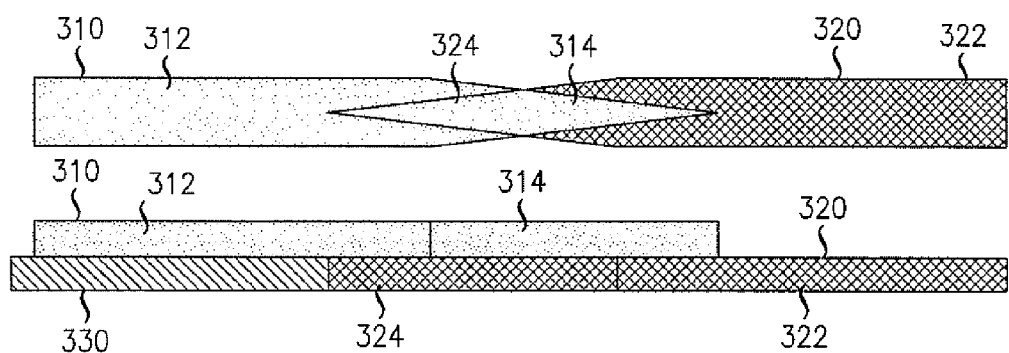
FIG. 3 illustrates a plan and side view of an embodiment of an optical waveguide coupling.

FIG. 3 illustrates a plan and side view of another embodiment of an optical waveguide coupler. In this embodiment, the taper areas 314, 324 of the first and second optical waveguides 310, 320 overlap one another. The amount of overlap and length of the tapers may be selected in order to allow all desired propagation modes to pass through the optical waveguide coupler.

Figure 4:
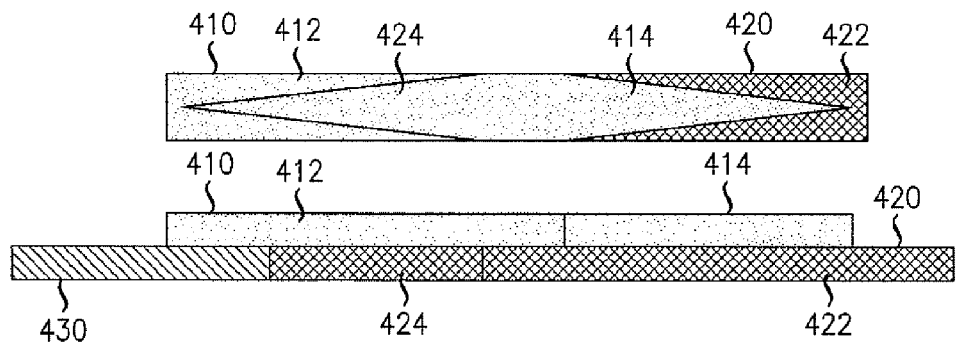
FIG. 4 illustrates a plan and side view of an embodiment of an optical wave guide coupling.

FIG. 4 illustrates a plan and side view of another embodiment of an optical waveguide coupler. In this embodiment, the first areas 412, 422 of the first and second optical waveguides 410, 420 overlap. The amount of overlap may be selected in order to allow all desired propagation modes to pass through the optical wave guide coupler.

Figure 5:
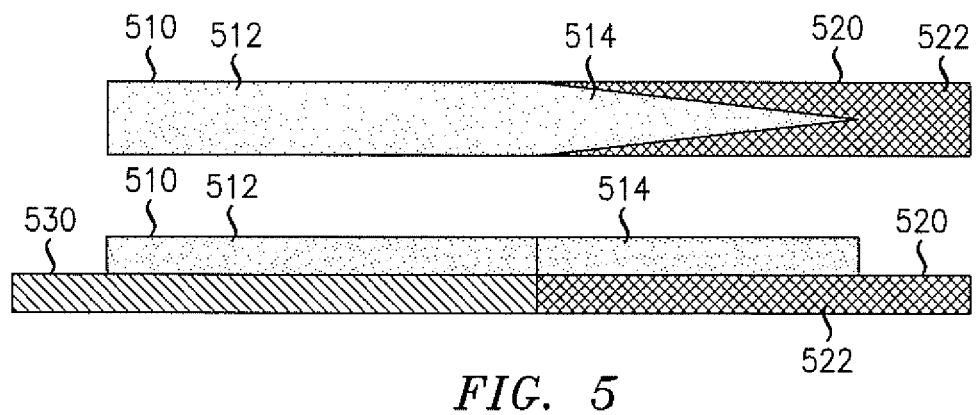
FIG. 5 illustrates a plan and side view of an embodiment of an optical wave guide coupling.

FIG. 5 illustrates a plan and side view of another embodiment of an optical waveguide coupler. In this embodiment, only the first layer 510 has a tapered area 514. The first area 522 of the second layer 520 is shown as extending to the boundary between the first area 512 and the tapered area 514 of the first optical wave guide 510. It is also possible for the first area 522 of the second layer 520 to extend beyond this boundary or to not reach this boundary. If the first and second optical wave guides are made of different materials, the optical waveguide with the greater index of refraction may have tapered region.

Figure 6:
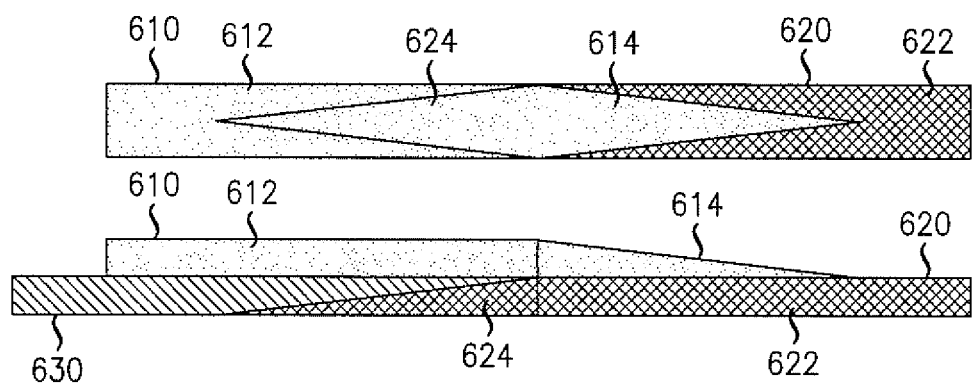
FIG. 6 illustrates a plan and side view of an embodiment of an optical waveguide coupling.

FIG. 6 illustrates a plan and side view of another embodiment of an optical waveguide coupler. The first and second taper areas 614, 624 in addition to having a tapered width, also may have a vertical taper. This vertical taper may further facilitate the coupling of a light signal from one optical waveguide into the other optical waveguide. The vertical taper may also only be applied to one of the taper areas 614, 624. Further, a vertical taper may be used when only one of the waveguides has a tapered area as shown above in FIG. 5.

Figure 7:
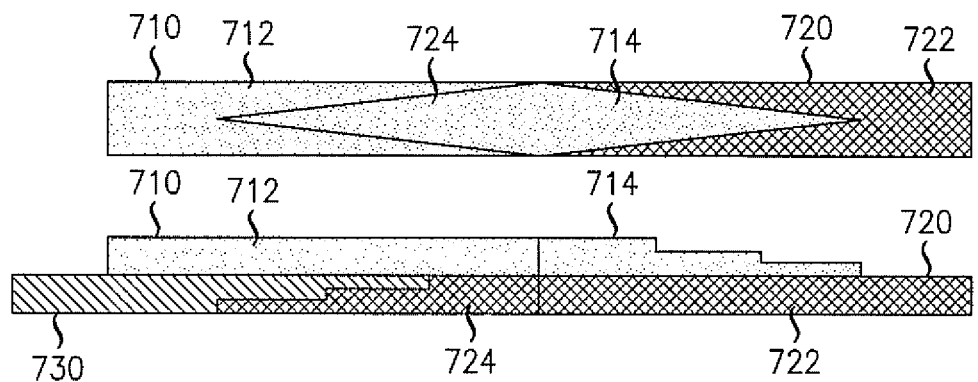
FIG. 7 illustrates a plan and side view of an embodiment of an optical wave guide coupling.

FIG. 7 illustrates a plan and side view of another embodiment of an optical waveguide coupler. The first and second taper areas 714, 724 in addition to having a tapered width, also may have a stepped vertical taper. As above, this vertical taper may further facilitate the coupling of a light signal from one optical waveguide into the other optical waveguide. The stepped vertical taper may also only be applied to one of the taper areas 714, 724. Further, a stepped vertical taper may be used when only one of the waveguides has a tapered area as shown above in FIG. 5. In addition to the linear and stepped vertical tapers, a non-linear vertical taper may be used as well.

The optical waveguide coupler may be manufactured using standard semiconductor manufacturing techniques. Further, the optical waveguides may be manufactured in conjunction with the optical devices that they are connected to. For example, a first waveguide material may be deposited on a substrate and patterned as shown in any of the above described embodiments. Next, a planarization layer may be deposited to provide a flat surface across the first wave guide material and the planarization layer. Next, a spacer material may be deposited on the first waveguide and the planarization layer. Then a second waveguide material may be deposited on the spacer material and patterned as shown in any of the above described embodiments. Finally, a cladding layer may be deposited to cover the optical waveguide coupler.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. An optical waveguide coupler comprising:
   a first optical waveguide including a first area and a tapered area having a tapered width;
   a second optical waveguide including a first area and a tapered area having a tapered width;
   wherein the first area of the of the second optical waveguide overlaps the tapered area of the first optical wave guide,
   wherein the tapered area of the second optical waveguide overlaps the first area of the first optical waveguide, and
   wherein the dimensions of the first and second optical waveguide are configured to allow selected propagation modes of a multimode signal to pass through the optical waveguide coupler.

2. The optical waveguide coupler of claim 1, wherein the first and second optical waveguides are made of different materials.

3. The optical waveguide coupler of claim 1, further comprising a planarization layer, wherein the planarization layer has a thickness approximately the same as a thickness of the first optical waveguide and wherein the first area of the second optical waveguide overlaps the tapered area of the first optical waveguide and the planarization layer.

4. The optical waveguide coupler of claim 1, further comprising, a spacing layer between the first and second optical waveguide.

5. The optical waveguide coupler of claim 1, wherein the thickness of the tapered area of the second optical waveguide is vertically tapered.

6. The optical waveguide coupler of claim 5, wherein the vertical taper is a stepped taper.

7. The optical waveguide coupler of claim 1, wherein the first area of the first optical waveguide overlaps the first area of the second optical waveguide.

8. The optical waveguide coupler of claim 1, wherein the taper area of the first optical waveguide overlaps the taper area of the second optical waveguide.

9. An optical waveguide coupler comprising:
   a first optical waveguide including a first area and a tapered area having a tapered width;
   a second optical waveguide including a first area;
   wherein the first area of the of the second optical waveguide overlaps the tapered area of the first optical wave guide, and
   wherein the dimensions of the first and second optical waveguide are configured to allow selected propagation modes of a multimode signal to pass through the optical waveguide coupler.

10. The optical waveguide coupler of claim 9, wherein the index of refraction of the first optical waveguide is greater than the index of refraction of the second optical waveguide.

11. The optical waveguide coupler of claim 9, wherein the thickness of the tapered area of the first optical waveguide is vertically tapered.

12. The optical waveguide coupler of claim 11, wherein the vertical taper is a stepped taper.

13. The optical waveguide coupler of claim 9, further comprising a planarization layer, wherein the planarization layer has a thickness approximately the same as a thickness of the first optical waveguide and wherein the first area of the second optical waveguide overlaps the planarization layer.

14. A method of manufacturing an optical waveguide coupler, comprising:
   depositing and patterning a first optical waveguide material to form a first optical waveguide including a first area and a tapered area having a tapered width;
   depositing and patterning a second optical waveguide material to form a second optical waveguide including a first area and a tapered area having a tapered width;
   wherein the first area of the of the second optical waveguide overlaps the tapered area of the first optical wave guide,
   wherein the tapered area of the second optical waveguide overlaps the first area of the first optical waveguide, and
   wherein the dimensions of the first and second optical waveguide are configured to allow selected propagation modes of a multimode signal to pass through the optical waveguide coupler.

15. A method of claim 14, further comprising, forming a planarization layer after the formation of the first optical waveguide, wherein the planarization layer has a thickness substantially the same as the first optical waveguide.

16. A method of claim 14, further comprising, forming a spacing layer between the first and second optical waveguide.

17. A method of claim 14, wherein the thickness of the tapered area of the second optical waveguide is vertically tapered.

18. A method of claim 14, wherein the vertical taper is a stepped taper.

* * * * *